I. W. McGAFFEY,

Assignor, by mesne assignments, to E. B. PRESTON.

FOUNTAIN HOSE CARRIAGE.

No. 10,047. Reissued Feb. 28, 1882.

WITNESSES—
A. Everett Brown
W. M. Munday.

INVENTOR—
Ivers W. McGaffey.
by Munday Evarts & Adcock
his Atty's.

UNITED STATES PATENT OFFICE.

IVES W. McGAFFEY, OF CHICAGO, ILLINOIS, ASSIGNOR, BY MESNE ASSIGNMENTS, TO E. B. PRESTON, OF SAME PLACE.

FOUNTAIN-HOSE CARRIAGE.

SPECIFICATION forming part of Reissued Letters Patent No. 10,047, dated February 28, 1882.

Original No. 183,188, dated October 10, 1876. Application for reissue filed January 21, 1882.

*To all whom it may concern:*

Be it known that I, IVES W. McGAFFEY, of Chicago, in the county of Cook and State of Illinois, have invented certain Improvements in Fountain-Hose Carriages, of which the following is a specification.

Figure 1:
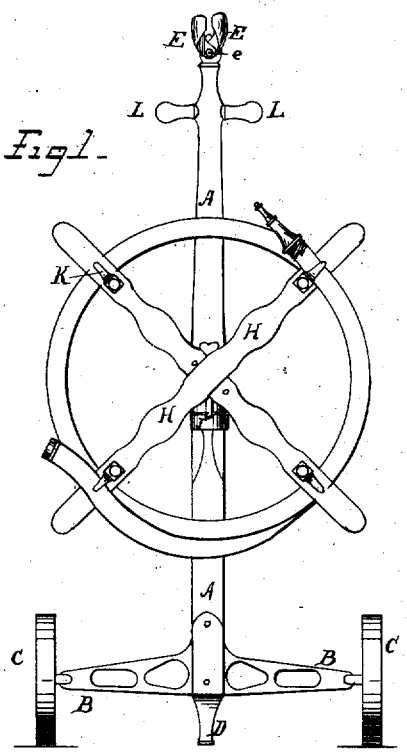
Figure 2:
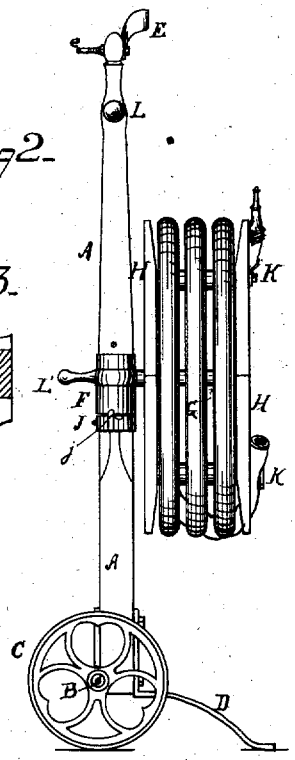
Figure 3:
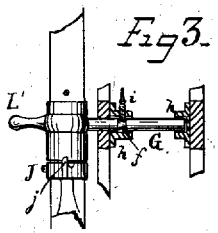

In the accompanying drawings, which form a part of this specification, Figure 1 is a front view of the improved combined portable fountain-standard and hose-reel. Fig. 2 is a side elevation of the same. Fig. 3 is a fragmentary sectional view of the reel-spindle, &c.

Like letters of reference made use of in the several figures indicate like parts wherever employed.

In the said drawings, A represents a standard, mounted upon an axle, B, to which are applied the wheels C C and a foot, D, so contrived, as shown, that when the device rests upon the tripod formed by the wheels and the foot the standard will assume an upright vertical position, to serve as a suitable fountain-standard, and for this purpose the standard A is provided with a nozzle-holding contrivance applied to the upper end thereof, and consisting of a pair of shell-shaped halves, E E, which are secured to the standard by a thumb-screw bolt, *e*, through the flattened overlapping lower ends of the scrolls or shells serving to hold the contrivance in place; also, to afford a hinge upon which the halves may be opened; also, as a pivot upon which the thing as a whole may be set at various angles, and also as a means of locking the shells upon the nozzle to hold it in the required position.

Upon the standard A, at a suitable height from the ground, is a collar, F, fitted to turn loosely upon the standard. To this collar is affixed or made fast therewith the reel-spindle G, upon which is placed the hose-reel H, provided for this purpose with hollow hubs *h h*. A set-screw, *i*, through one of the hubs enters a groove, *f*, cut around the spindle, and serves to hold the reel from slipping off. It also serves as a means of locking the reel from turning, and also as a means for applying friction as a brake to prevent the reel from turning too freely, when desired, the two latter results being obtained by applying more or less friction, as required.

Below the collar F is a seating, J, upon which the collar rests. This seating is provided with stops *j j* at both sides and in front, so that the reel may be placed in three positions by simply raising the collar free from the stops and turning it—that is to say, it may be borne upon the standard in front, as shown in the drawings, or it may be swung around to either the right or left side.

In picking up or unreeling the hose it will be found convenient to swing the reel around to one side or the other, so that its axis will be parallel to the axis of the ground wheels. This adjustability to three positions on the standard also enables me to poise the nozzle more readily to different points when said nozzle is held by one of the clasps K on the face of the outer reel-arms, instead of by the holder at the top of the standard. The clasps K, it will be noticed, are secured to the face of the outer reel-arms, and they serve not only as a means for holding the nozzle, when desired, but also for holding the butt of the hose when it is all reeled in, or for holding an intermediate part when the butt is connected to the hydrant.

The handles L L, near the top of the standard, are to afford a grasp in wheeling the apparatus about from place to place. Another handle, L′, projecting to the rear from the collar, serves as a hold for the other hand in shifting about and adjusting.

In operation the butt of the hose may be attached to the hydrant, and the body of the hose being upon the reel, the standard and reel may be wheeled along to the place desired, paying out hose as it goes. More or less hose may be thus paid out, and the nozzle being poised to its work, it may remain in operation for a time in a fixed position or at rest; or the apparatus may be moved about from place to place and the hose taken up or paid out to suit, while the water is playing as well as when shut off. The reel being supported at a considerable height from the ground renders it possible to employ a reel of a sufficient diameter so that the water will freely flow through the portion of the hose wound thereon.

It will be seen, therefore, that the apparatus may be used as a lawn fountain or sprinkler and moved from place to place without touching the hose with the hands, thus avoiding the dirt and wet; and also that the hose may be taken up or paid out from the standard itself as it is moved about, which is a better way than having the standard at one place and the reel at another, or than having no reel, because the work may be all attended to at the standard, and no more hose left on the ground than is absolutely necessary. With a view to this method of using the apparatus, a peculiar feature of the reel consists in the fact that the hose is wound upon four separate points or bars. This, in connection with the large diameter of the reel, facilitates the discharge of the water. To make this clear it is necessary to understand that each bar is liable to make a dent upon the inner side of the hose. This dent the water passing through will straighten out; but the effort to straighten the dent will cause a tendency of the hose to rise at this point and in the part of the hose between the bars to recurve or bend toward the center of the reel. Now, if a solid drum is employed, or a reel composed of a large number of bars, this rising and recurving tendency is resisted by the intermediate points or bars, and the dent or flattening or compression resists the water and will not straighten out. By sufficiently loosening the set-screw so that it will clear the groove in the spindle, the reel may be taken entirely off from the standard, and the latter in such case may be used as a plain reelless fountain-standard.

Having thus fully described my invention, what I claim as new, and desire to secure by Letters Patent, is—

1. The combined hose-carriage and fountain-standard, consisting in the combination of the following elements, viz: a wheeled carriage provided with a foot or brace by means of which it may be sustained in an upright vertical position, a nozzle-holding device, and a reel of large diameter to allow the water to flow through the hose when partially wound thereon, substantially as specified.

2. The combination of a hose-reel of large diameter to allow the water to flow through the hose wound thereon with a wheeled carriage for carrying said reel, provided with a foot or brace for sustaining it in an upright position, and devices for holding the nozzle both on the carriage and the reel, substantially as specified.

3. The reel pivoted in two ways to the standard, one pivot being its own axis for reeling and unreeling the hose, and the other pivot at right angles thereto, allowing the reel to swing around the standard, substantially as specified.

4. The combination, with a hose-reel of large diameter to permit the water to flow through the hose wound thereon and adapted to be fixed in position on its axle, of devices for holding the nozzle on the arms of the reel, substantially as specified.

5. The combination of the reel, the standard, and the sleeve which supports the former upon the latter, together with the stops upon the sleeve for locking it in several positions, substantially as specified.

6. The peculiarly-constructed clasp upon the top of the standard for holding the nozzle, consisting of two shell-like halves secured by a single bolt through the standard, which bolt serves as a pivot upon which the device may be adjusted, as a hinge upon which it may be opened, and as a means of locking it in the desired position when attained, substantially as specified.

7. The wheeled reel-bearing standard, having handles L L near the top and the handle L′ near the middle, substantially as specified.

8. The reel carried upon a spindle having grooves cut around it, in combination with the set-screw through the reel-hub, substantially as specified.

9. The combination, with a fountain-standard provided with wheels, of a hose-reel of large diameter to allow the water to flow through the hose wound thereon, substantially as specified.

IVES W. McGAFFEY.

Witnesses:
H. M. MUNDAY,
EDW. S. EVARTS